United States Patent [19]

Resnikoff

[11] Patent Number: 4,830,482
[45] Date of Patent: May 16, 1989

[54] TRUE-FOCUS BIFOCAL EYEGLASSES

[76] Inventor: Howard L. Resnikoff, 31 Myopia Rd., Winchester, Mass. 01890

[21] Appl. No.: 88,964

[22] Filed: Aug. 21, 1987

[51] Int. Cl.$^4$ .............................................. G02C 7/06
[52] U.S. Cl. ..................... 351/172; 351/168
[58] Field of Search ................................ 351/172, 168

[56] References Cited

U.S. PATENT DOCUMENTS 1,401,327 12/1921 Erhard ............................... 351/168
2,030,968 2/1936 Culver et al. .
3,785,724 1/1974 Cretin-Maitenaz ................. 351/169

OTHER PUBLICATIONS

Helmholtz, "The Perceptions of Vision", Helmholtz's Treatise on Physiological Optics, vol. III, 1925, pp. 54–55.
"The History, Theory and Application of Multifocal Lenses—XIII", pp. 27–31.
"Modern Ophthalmic Lenses and Optical Glass," Obrig Laboratories, Inc., New York, N.Y., 1944, pp. 266–267.

Primary Examiner—John K. Corbin
Assistant Examiner—Terry S. Callaghan
Attorney, Agent, or Firm—Spencer & Frank

[57] ABSTRACT

An optical device for focusing images on the retinas of the left and right eyes of a human user, containing left and right corrective lenses each having a light receiving surface and first and second lens segments of different focal lengths for focusing near and far objects respectively. The boundary between the first and second segments of each of the lenses extends in the same direction and parallel to the light receiving surface, and the lenses are supported and oriented with respect to the eyes of the user so that the boundary is substantially perpendicular to a line connecting the eyes of the user, and so that each first lens segment occupies a nasal position with respect to the user's eyes and each second lens segment occupies a temporal position with respect to the user's eyes.

9 Claims, 2 Drawing Sheets

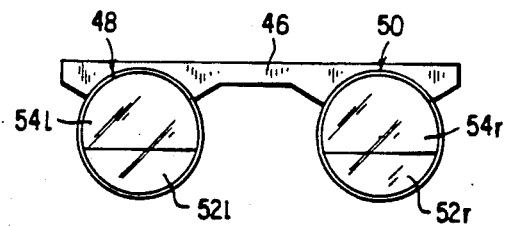
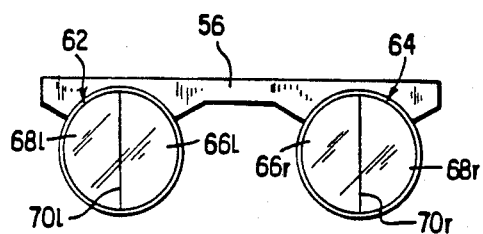
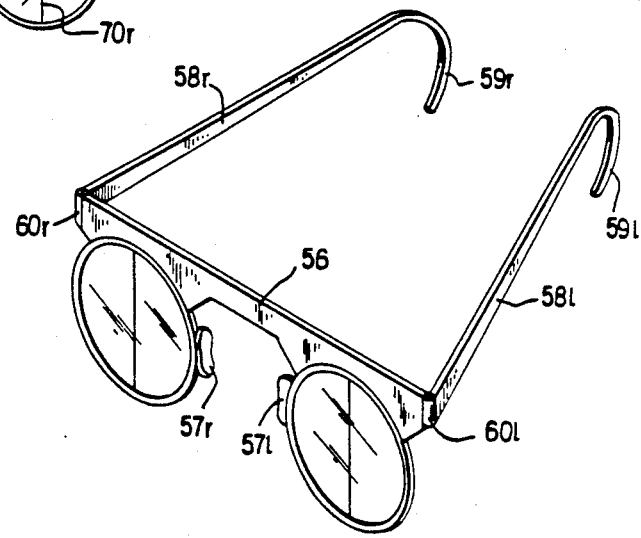
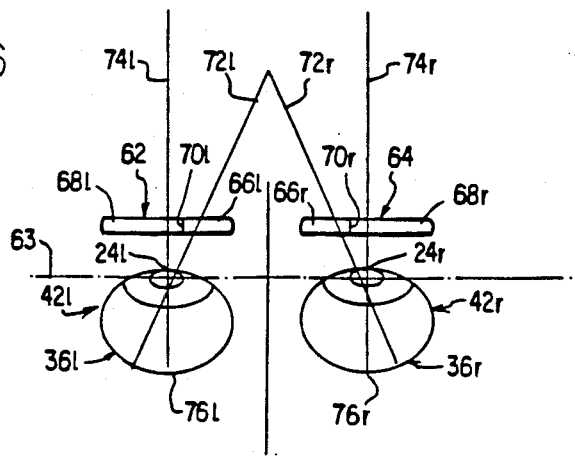

TRUE-FOCUS BIFOCAL EYEGLASSES

BACKGROUND OF THE INVENTION

This invention relates to means for combining images sensed through lenses of different focal lengths, and particularly to lenses for improving human vision.

A common defect in human vision is the inability of the eye to focus an image on the retina. The myopic eye fails to focus distant objects on the retina whereas the presbyopic eye fails to focus nearby objects on the retina. Myopia and presbyopia can each be corrected by appropriate but different lenses. The lenses of conventional bifocal eyeglasses consist of an upper lens segment for correct distance vision and a lower lens segment for correct near vision. The upper and lower lens segments are joined along a horizontal line.

When the user of conventional bifocal lenses views a distant object, the light that passes through the upper segments of the right and left lenses is focused on the lower portion of the corresponding retina but the light that passes through the lower segments of the lenses falls on the upper portion of the corresponding retina where it is not in focus. Thus the partial retinal image formed by the light that passes through the lower lens segments is blurred.

Similarly, when the user of conventional bifocal lenses views a nearby object, the partial retinal image formed by the light that passes through a lower lens segment is correctly focused on the upper portion of the retina and is therefore sharp but the partial retinal image formed by the light that passes through the upper lens segment is not in focus on the lower portion of the retina and that image is consequently blurred. Thus, conventional bifocal lenses produce retinal images that are partly in focus and partly blurred in corresponding parts of both retinas. This property of conventional lenses can cause difficulties for the use in certain viewing circumstances.

For example, when descending a staircase, the gaze is normally directed downward. Thus the line of sight from the stairs to the retina will pass through the lower lens segment and form a blurred partial retinal image on the upper parts of both retinas. The use of a desktop personal computer provides another example. In this case the computer keyboard is typically located in such a position that the line of sight from the keys to the retina will pass through the lower lens segments. Since the keyboard is near the eyes, this partial retinal image will be in focus. But the display screen is typically located at eye level and the line of sight from the display screen to the retina will pass through the upper lens segments. Since the information displayed on the screen typically consists of text and other material that incorporates fine detail which must be near the eyes in order to be seen, this partial retinal image will be blurred on corresponding parts of both retinas.

Various type of bifocal and multifocal lenses have been used in the past to solve particular problems. For example, in Kozol, *Optical Journal Review*, Apr. 1, 1963, "The History, Theory and Application of Multifocal Lenses - XIII", pages 27--31, and Obrig, *Modern Ophthalmic Lenses and Optical Glass*, Obrig Laboratories Incorporated, New York, New York 1944, pages 266-267, several different arrangements of lenses are discussed. These include trifocal lenses, which have intermediate focusing lens segments as well as near focusing and distant focusing lens segments, and lens arrangements which allow the user to focus at one distance when looking to the right and another distance when looking to the left.

More specifically, the Optical Journal Review article discloses at pages 29 and 30 vertical segment vocational bifocals in which, as shown in FIG. 34 L on page 30, lenses are proposed having a distance correction to the right of the nasal pupillary border of the user's left eye and to the right of the temporal pupillary border of the right eye. Segments having an intermediate distance correction are located to the left of the respective nasal and temporal pupillary borders. Also, as shown in FIG. 34 M at page 30 of the Optical Journal Review article, the distance correction may be to the left and the intermediate correction to the right of the pupillary borders.

FIGS. 1 A and 1 B shows prior art bifocals of this type viewed from the side of the lenses facing the wearer wherein the numeral 10 designates a frame for supporting left and right lenses 12 and 14, 16 *l* and 16 *r* lens segments of the left and right lenses 12 and 14 which are respectively ground to correct for objects located at a relatively great distance from the user and 18 *l* and 18 *r* lens segments of the left and right lenses which correct for objects closer to the viewer. In FIG. 1 A, the lens segments 16 *l* and 18 *l* are joined along a vertical line 20 situated at the nasal pupillary border (i.e., at that edge of the pupil nearest to the wearer's nose) and lens segments 16 *r* and 18 *r* along a vertical line 22 situated at the temporal pupillary border of the user (i.e., at that edge of the pupil nearest to the wearer's temple). The location of the wearer's pupils, designated by circle 24 *l* and 24 *r*, would be to the left of the pupillary borders and therefore the lenses 18 *l* and 18 *r*, ground to correct for images located at an intermediate distance from the use, would be in front of the pupils when the user is looking straight ahead. Conversely, in FIG. 1 B, the lens segments 16 *l* and 18 *l* are to the left and right respectively of a vertical line 22' situated at the temporal pupillary border and the lens segments 16 *r* and 18 *r* to the left and right respectively of a vertical line 20' located at the nasal pupillary border.

Prior art lenses of this type may be used by artists or musicians who must focus on a canvas or music stand positioned at an intermediate distance to their one side and a model or conductor located further away on their other side. The bifocals of FIG. 1 A would therefore be used by an artist or musician whose canvas and music are at an intermediate distance to his left and the model or conductor at a greater distance to his right. The bifocals of FIG. 1 B would be used when the scenes being viewed were reversed.

These known lens arrangements having vertically oriented lens segments have the same disadvantage as conventional bifocal lenses. That is, under commonly occurring conditions in which both near and far objects occupy both right and left halves of the field of vision, the retinal images that are produced are partly in focus and partly blurred in corresponding parts of both retinas. Thus, these prior art bifocals, which are designed for a specific type of viewing situation, are no better than conventional bifocals if the specific viewing situation for which they are designed is not present.

The purpose of the present invention is to eliminate these and similar problems of conventional bifocal lenses.

SUMMARY OF THE INVENTION

The present invention is an optical device for focusing images on the retinas of the left and right eyes of a human user. The device comprises left and right corrective lenses, each having a light receiving surface and first and second lens segments of different focal lengths for focusing near and far object respectively. The boundary between the first and second segments of each of the lenses extends in the same direction and parallel to the light receiving surface, and the lenses are supported and oriented with respect to the eyes of the user so that the boundary is substantially perpendicular to a line connecting the eyes of the user. Each first lens segment occupies a nasal position with respect to the user's eyes and each second lens segment occupies a temporal position with respect to the user's eyes.

BRIEF DESCRIPTION OF THE DRAWINGS

FIG. 3 is a schematic diagram of conventional bifocal eyeglasses.

FIG. 4 is an illustration in perspective showing bifocal eyeglasses in accordance with the present invention.

FIG. 5 is a schematic diagram showing bifocal eyeglasses according to the present invention as seen by a person wearing the glasses.

FIG. 6 is a schematic diagram showing how the location of the juncture of lens segments is related to the direction of the gaze when near and distant objects are viewed.

DESCRIPTION OF THE PREFERRED EMBODIMENTS

Figure 1A:
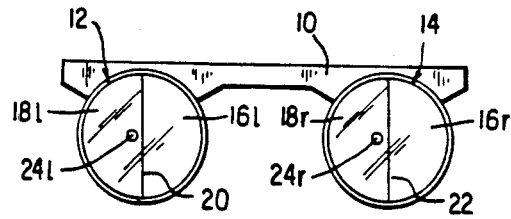
FIGS. 1A and 1B illustrate prior art vertical lens segment bifocals.
Figure 1B:
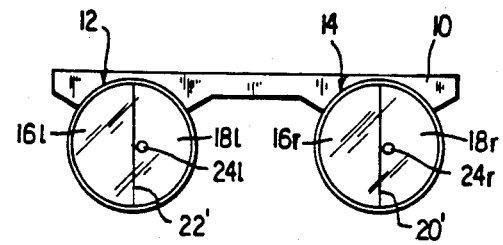
Figure 2:
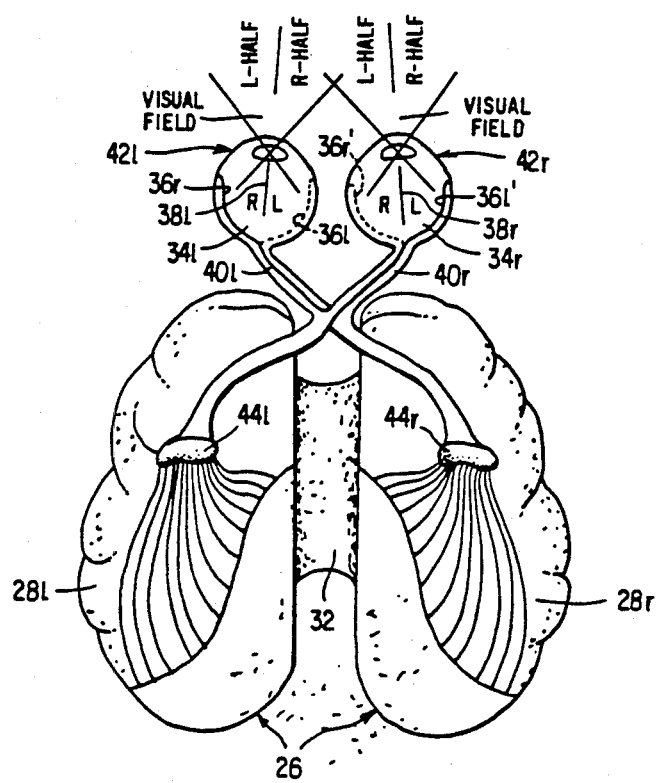
FIG. 2 is a schematic diagram of the human vision system showing how the neural pathways from the retinas are connected to the optic chiasm, the lateral geniculate nuclei of the cerebral hemispheres, and the visual fields of the cerebral cortex.

FIG. 2 is a schematic diagram of the human vision system. The cerebral cortex 26 of a person is divided into a right cerebral hemisphere 28 r and a left cerebral hemisphere 28 l which are joined by the corpus callosum 32. The left retina 34 l is divided into two roughly equal portions 36 l and 36r which receive light originating at the left and right respectively of the person, and the right retina 34 r is divided into two similar portions 36 l and 36 r'. The retinal portions 36 r and 36 l are separated by vertical plane 38 l in an individual whose head is oriented in a normal upright position and the retinal portions 36 l' and 36 r' are separated by a vertical plane 38 r. The neurons that connect the surfaces of the retinas 34 l, 34 r to the cerebral cortex are bundled together in the optic nerves 40 l, 40r which pass through the exterior surfaces of the eyeballs 42l, 42r to the optic chiasm 43 where the optic nerves 40 l, 40r of both eyes meet. The neurons from the left part 36 of the retina 34 l of the left eye and those from the left part 36 l' of the retina 34 r of the right eye are grouped together and their projections terminate in the lateral geniculate nucleus 44 r of the right cerebral hemisphere 28 r. Similarly, the neurons from the right part 36 r of the retina 34 l of the left eye and those from the right part 36 r' of the retina 34 r of the right eye are also grouped together and their projections terminate in the lateral geniculate nucleus 44 l of the left cerebral hemisphere 28 l. Thus, each cerebral hemisphere receives information about the visual fields from congruent parts of both eyes.

Each cerebral hemisphere analyzes the pair of partial images that it receives and produces outputs that the brain uses to interpret the images.

FIG. 3 shows conventional bifocal glasses which comprise a frame 46 holding a left lens 48 and a right lens 50. Each lens has a lower segment 52 l, 52 r ground for near vision and an upper segment 54 l, 54 r ground for distant vision.

When conventional bifocal eyeglasses are used, the information transmitted to a cerebral hemisphere from corresponding points on the two retinas will consist of date for a pair of image points that are either both in focus or both blurred according to whether the corresponding points on the retina are viewing a region in the scene through the appropriate bifocal lens segment or not. Thus, with respect to a given point in the viewed scene a cerebral hemisphere will either have information that is all in focus or information that is all blurred. The brain cannot construct an accurate representation of the viewed scene that is everywhere in focus because the system of lenses does not provide the required information.

These disadvantages are overcome by the present invention which provides each cerebral hemisphere with the information required to construct a representation that is in focus for every point of the viewed scene. One embodiment of the invention is shown in FIGS. 4 and 5 wherein FIG. 4 is a perspective view of glasses comprising a frame 56 having hinged attachment members 58 l and 58 r rotatably fastened to the frame by hinges 60 l, 60 r. The frame includes earpieces 59 l, 59 r to rest on the user's ears and nosepieces 57 l, 57 r to rest on the user's nose. FIG. 5 shows the glasses from the side seen by the user, and includes left and right lenses 62 and 64 respectively.

Each lens 62, 64 has a segment 68 l, 68 r respectively focused for viewing distant objects and a segment 66l, 66 r respectively focused for viewing nearer objects. The segments 66 l and 66r, focused for viewing nearer objects, both occupy the nasal positions (next to the user's nose) of lenses 62 and 64 respectively, while the segments 68 l and 68 r, focused for viewing distant objects, both occupy the temporal positions (next to the user's temple) of the respective lenses 62 and 64. The lens segments are joined along lines 70 l and 70 r; these lines are substantially straight, and vertical with respect to the wearer when the wearer is in a normal upright position.

FIG. 6 is a schematic top view, looking down at the lenses 62, 64 and eyeballs 42 l, 42, line 63 being a reference line joining the pupils 24, 24 r of the user. Light coming from a nearby object follows the paths 72 l and 72 r, passing through the lens segments 66 l and 66 r which are ground to correct for viewing near objects, through pupils 24 l and 24 r and striking the left part of the left retina 36 l and the right part of the right retina 36 r. Thus light from a nearby object is received by noncorresponding parts of the two retinas.

Light coming form a hypothetical object at infinity would follow paths 74 l and 74 r, passing through the lens segments 68 l and 68 r which are ground to correct for viewing distant objects, through pupils 24 l and 24 r and striking the retina at points 76 l and 76 r.

The vertical junctions 70 l and 70 r must therefore be positioned in vertical planes which fall between the vertical planes containing the far and near light paths as these planes intersect the lens. This requires that junction 70 *l* must lie between two vertical planes, one of which contains line 74 *l* and the other of which contains line 72 *l*. Likewise, junction 70 *r* lies between two vertical planes similarly containing lines 72 *r* and 74*r*.

The invention now being fully described, it will be apparent to one of ordinary skill in the art that many changes and modifications can be made thereto without departing from the spirit or scope of the invention as set forth herein.

What is claimed is:

1. An optical device for focusing images on the left and right retinal portions of the retinas of the left and right eyes of a user, each of said left and right retinal portions being separated by respective left and right substantially vertical planes when the head of said user is oriented in the upright position, comprising left and right corrective lenses each having a light receiving surface and first and second lens segments of different focal lengths for focusing near and far objects respectively, the boundary between the first and second segments of each of said lenses extending in the same direction parallel to said light receiving surface and substantially coincident with the left and right vertical planes separating said left and right retinal portions repectively of the left and right eyes of the user, each said first lens segment occupying a nasal position and each said second lens segment occupying a temporal position with respect to said user's eyes.

2. An optical device as defined in claim 1 in which said boundary lies to the nasal side of a plane which is parallel to the boundary and contains a light path defined by a ray of light reaching the user's eyes from an object at infinity when said light path is substantially perpendicular to a line formed by connecting the centers of the user's pupils.

3. An optical device as defined in claim 1 wherein each of said left and right corrective lenses has only two lens segments.

4. An optical device for focusing images on the left and right retinal portions of the retinas of the left and right eyes of a user, each of said left and right retinal portions being separated by respective left and right substantially vertical planes when the head of said user is oriented in the upright position, comprising left and right corrective lenses each having a light receiving surface and first and second lens segments of different focal lengths for focusing near and far objects respectively, the boundary between the first and second segments of each of said lenses extending in the same direction parallel to said light receiving surface and substantially coincident with the left and right vertical planes separating said left and right retinal portions respectively of the left and right eyes of the user; and means for supporting and orienting said lenses with respect to the eyes of the user, each said first lens segment occupying a nasal position and each said second lens segment occupying a temporal position with respect to said user's eyes.

5. An optical device as defined in claim 4 wherein said boundary lies to the nasal side of a plane which is parallel to the boundary and contains a light path defined by a ray of light reaching the user's eyes from an object at infinity when said light path is substantially perpendicular to a line formed by connecting the centers of the user's pupils.

6. An optical device as defined in claim 4 wherein said means for supporting and orienting said lenses comprises a frame affixed to said lenses for removably placing said optical device in front of the user's eyes.

7. An optical device as defined in claim 6 wherein said left and right corrective lenses are fixed in position with respect to said frame.

8. An optical device as defined in claim 7 wherein each of said left and right corrective lenses has only two lens segments.

9. An optical device as defined in claim 4 wherein each of said left and right corrective lenses has only two lens segments.

* * * * *